United States Patent [19]

Asciutto

[11] 3,940,095
[45] Feb. 24, 1976

[54] PARACHUTE ASSEMBLY

[76] Inventor: Henry E. Asciutto, P.O. Box 1008, Romoland, Calif. 92380

[22] Filed: Oct. 10, 1974

[21] Appl. No.: 513,534

[52] U.S. Cl. .............................. 244/148
[51] Int. Cl.² ......................... B64D 17/40
[58] Field of Search .......................... 244/147, 148

[56] References Cited

UNITED STATES PATENTS

| | | | |
|---|---|---|---|
| 2,537,152 | 1/1951 | Moran | 244/148 |
| 2,663,524 | 12/1953 | Smith | 244/148 |
| 2,978,212 | 4/1961 | Istel et al. | 244/148 |
| 3,690,604 | 9/1972 | Guilfoyle | 244/148 |

FOREIGN PATENTS OR APPLICATIONS

| | | | |
|---|---|---|---|
| 1,209,208 | 2/1960 | France | 244/148 |
| 115,814 | 9/1942 | United Kingdom | 244/148 |

Primary Examiner—Trygve M. Blix
Assistant Examiner—Galen L. Barefoot
Attorney, Agent, or Firm—John H. Crowe; Jess M. Roberts

[57] ABSTRACT

A parachute assembly in which the canopy of the chute is rolled or folded to an elongated shape with the skirt at one end and that end is folded back toward the apex of the canopy. A panel of flexible sheet material having a base portion and a cover portion is attached to the canopy by the base portion and has the cover portion folded over the folded skirt of the canopy. The suspension lines of the parachute are grouped in a rope-like bundle which is folded in zigzag fashion to releasably join the cover portion of the panel to the base portion to form the panel into a casing that snugly encloses the folded skirt. The remainder of the elongated shape is folded over the casing to form a compact bundle which is releasably enclosed in a parachute container of conventional type. The folded state of the skirt end of the canopy positively prevents inflation of the canopy until the suspension lines are fully stretched out during a parachute jump.

8 Claims, 13 Drawing Figures

PARACHUTE ASSEMBLY

BACKGROUND OF THE INVENTION

This invention relates generally to parachute assemblies, and more particularly to such assemblies somewhat similar to that disclosed in U.S. Pat. No. 2,537,152 to Moran but differing therefrom in certain critically important features of a distinguishing character.

In a stowage system such as that of the Moran patent, the canopy is folded or rolled into an elongated shape with the skirt of the canopy at one end and the apex of the canopy at the other end. A panel of flexible sheet material is permanently attached to the canopy of the parachute and is folded over on itself to enclose the skirt end of the elongated shape.

The suspension lines of the parachute are grouped into a rope-like bundle, and the bundle is formed into a zigzag configuration to cooperate with yielding fasteners on the panel to keep the latter closed around the skirt end of the elongated shape. The remainder of the elongated shape is folded back onto the closed panel to form therewith a compact package, which is encased in the usual releasable manner in a parachute container for use by a jumper.

When the jumper opens the parachute container, the airstream stretches out the canopy first, then the folds of the rope-like bundle of suspension lines pull free from the yieldable fasteners of the panel to permit the suspension lines to stretch out and finally open the closed panel to free the canopy skirt for prompt inflation of the canopy.

A serious difficulty arises in the use of many parachute assemblies in that the airstream rams into the skirt of the canopy to tend to inflate the canopy prematurely; i.e., before the suspension lines are fully extended. Such premature inflation of the canopy tightens the slack suspension lines with a severe jolt that is hard on the jumper and subjects the parachute structure to damaging stresses. Another result of premature inflation is that the nylon suspension lines may rub on the nylon canopy to burn the canopy. Such a burn can spread into an extensive tear that may increase the rate of descent of the jumper unduly and result in a hard landing and possible injury to the jumper. Another result of premature inflation is that the slack suspension lines may wrap around the inflated canopy to cause hazardous instability of the canopy.

Certain attempts have been made in the prior art to prevent premature canopy inflation. The Moran patent, for example, teaches folding a special panel over the skirt end of the canopy when the canopy is formed into an elongated shape for stowage. This expedient has been found somewhat unsatisfactory, because there are liberal gaps in the leading edge of the folded panel, and when the jumper falls through space, the airstream passes through these gaps to enter the canopy skirt with ram action to cause the stowed canopy to balloon to bulbous shape.

The U.S. Pat. No. 3,690,604 (to Guilfoyle) teaches reefing the skirt of the stowed canopy; i.e., embracing the skirt end of the stowed canopy with a tight band that is intended to keep air from entering the skirt prematurely. The reefing, however, does not actually preclude the entrance of the airstream into the embraced skirt, with the result that the stowed canopy balloons to the bulbous shape shown in some of the drawings of the Guilfoyle patent. Reefing the skirt of the canopy, moreover, complicates the deployment procedure in that it makes necessary some provision for releasing the reefing when the suspension lines become fully stretched out.

It is apparent that there is a definite need for some means to absolutely prevent entrance of the airstream into the stowed canopy until the suspension lines are fully stretched out.

SUMMARY OF THE INVENTION

The primary object of my invention is to provide means for an ideal deployment sequence consisting of three stages, namely a first stage in which the canopy is extended, a second stage in which the suspension lines are fully stretched out, and a third stage in which the canopy is inflated; and to provide this ideal sequence with positive prevention of premature inflation of the canopy by ramming of the airstream into the canopy skirt.

A more specific object of the invention is to provide positive prevention of premature inflation of the canopy without resorting to reefing the skirt of the stowed canopy and without resorting to any other expedient that either introduces an extra deployment stage or requires additional stowage structure.

Broadly described, these objects of the invention are attained by providing means for folding the skirt of the canopy back towards the apex of the canopy and keeping the skirt folded until the time arrives for inflation of the canopy. Thus, in stowing the parachute for subsequent deployment, the canopy of the parachute is first folded or rolled to the usual elongated shape with the skirt of the canopy at one end of the elongated shape. The new concept is to fold back the skirt end of the elongated shape and then to close the panel around the folded skirt, to keep the skirt folded until the time arrives for inflation of the canopy.

In the first two stages of the deployment sequence during which first the elongated canopy shape is extended and then the suspension lines are stretched out, the elongated canopy shape falls through space with the folded skirt foremost. Thus, the airstream rams against the folded end of the elongated shape instead of ramming directly into the edges of the stowed skirt. Actually, with the skirt folded away from the airstream, the airstream tends to evacuate the skirt rather than to inflate it. When the suspension lines are fully stretched out, the suspension lines unfold the skirt of the elongated shape, to permit the airstream to ram into the skirt for prompt inflation of the parachute canopy.

The attainment of these two objects of the invention is further assured by connecting a small pilot parachute to the apex end of the canopy. The drag action of the small pilot parachute assures that the canopy is fully extended when the canopy skirt is unfolded for inflation of the canopy.

The invention employs a panel of flexible sheet material that is divided into a base portion and a foldable cover portion, with the base portion being permanently attached to the outer side of the parachute canopy in the same general manner as disclosed in the Moran patent. The invention differs from the prior art, however, in teaching attachment of the base portion of the panel to the canopy at a location which is spaced substantially from the edge of the canopy skirt. The new location of the base portion of the panel at a given distance from the edge of the skirt serves the purpose of the invention in permitting a skirt portion of the canopy of substantially the length of the given distance to be folded over onto the region of the base portion of the panel before the cover portion of the panel is closed.

To keep the folded panel closed to serve as a casing for the folded skirt until the time of deployment, the suspension lines of the parachute are grouped, in the usual manner, into a rope-like bundle, and this bundle is folded in a well-known manner to zigzag configuration with the folds of the zigzag configuration engaging yieldable fasteners on the panel. In the deployment sequence, the rope-like bundle of suspension lines is unfolded progressively with sequential release from the yieldable fasteners to permit the suspension lines to stretch out and the final step of the unfolding sequence opens the closed panel and unfolds the canopy skirt for prompt inflation of the canopy.

A feature of the invention is that since it provides for an ideal deployment sequence in a thoroughly reliable manner, it is especially suitable for application to a zero-porosity parachute. The heretofore-prevalent type of parachute canopy is made of relatively porous material so that a canopy of relatively large diameter is required for adequate retardation of the descent of a jumper. With the canopy made of zero-porosity sheet material, the diameter of the canopy may be greatly reduced to make it safe to drastically reduce the size of the parachute pack.

The various features and advantages of the invention may be understood from the following detailed description of the preferred embodiments, and the accompanying drawings.

DESCRIPTION OF THE PREFERRED EMBODIMENT

Figure 1:
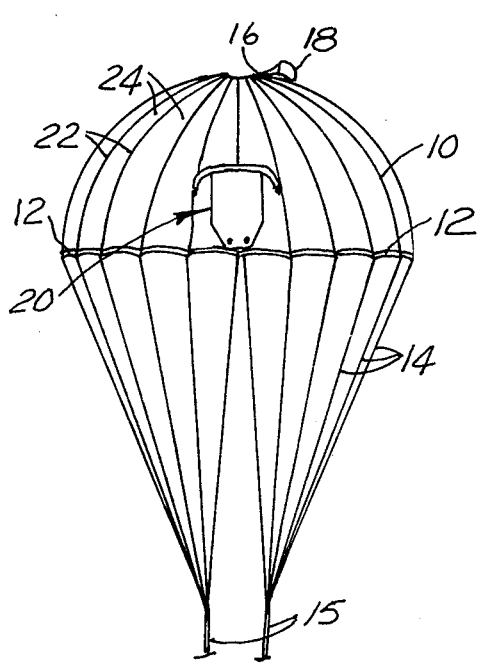
FIG. 1 is a side elevation of a fully-inflated parachute incorporating the teachings of the present invention.

In FIGS. 1–8, illustrating the first embodiment of the invention, FIG. 1 shows a fully deployed parachute assembly comprising a canopy 10 having a lower marginal skirt 12, the usual plurality of suspension lines 14 and a pair of risers 15 that connect the suspension lines to the harness (not shown) of the jumper. Connected to the apex of the canopy 10 by a short line 16 is a small pilot parachute 18, which at this stage is idle after serving its purpose in the early stages of the deployment sequence.

A panel, generally designated by reference numeral 20, is made of suitable flexible sheet material, such as heavy nylon fabric, and is attached to the canopy 10 in a position that straddles one of the radial seams 22 that divides the canopy into a plurality of gores 24. The outer face of the panel 20 is shown in FIG. 1, and FIG. 2 shows, on a larger scale, the inner face of the panel that lies against the canopy 10 in FIG. 1.

Figure 2:
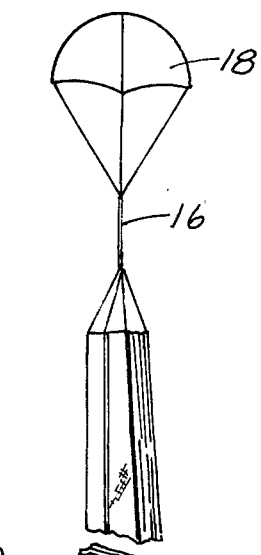
FIG. 2 is an elevational view of the back face of a panel of flexible sheet material that is permanently attached to the canopy of the parachute as shown in FIG. 1.
Figure 2:
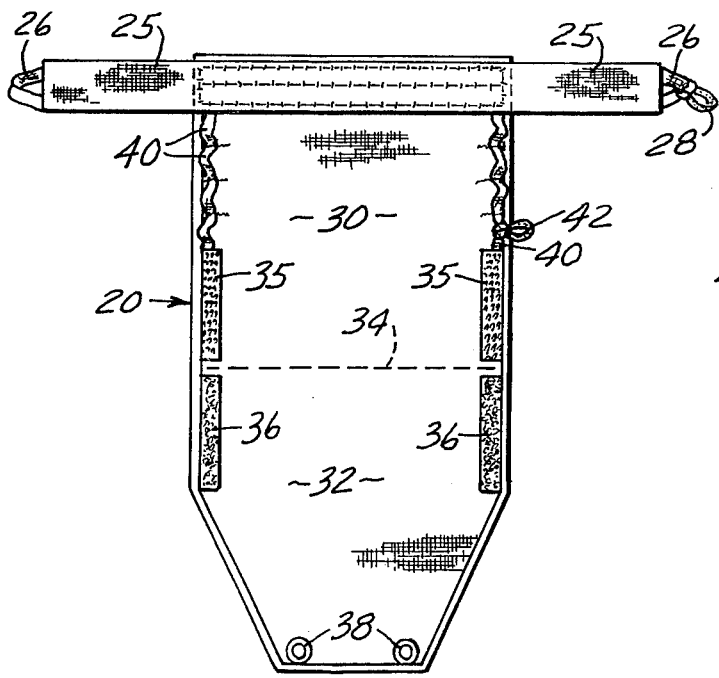

Referring to FIG. 2, the panel 20 includes a transverse strap that is sewn to the upper edge of the panel with ends 25 of the strap extending beyond the opposite side edges of the panel. Each strap end 25 has a loop 26 of tape sewn to its outer end and in a well-known manner each tape loop carries a relatively heavy rubber band 28 (only one of which is shown in FIG. 2) which is doubled back on itself for engagement with the tape loop. The panel 20 is divided into an upper base portion 30 and a lower cover portion 32, which may be folded back over the base portion, the fold line being indicated by a dotted line 34.

Adjacent the fold line 34, the side margins of the base portion 30 of the panel are provided with fastener patches 35 and in like manner the cover portion 32 is provided with corresponding fastener patches 36. The fastener patches 35 and 36 are available in commerce under the trademark "Velcro", the patches 35 having numerous minute plastic hooks for releasable engagement with minute plastic loops of the patches 36. The lower end of cover portion 32 of the panel is tapered as shown and is provided at its opposite corners with grommets 38 for cooperation with the rubber bands 28 on the strap ends 25 in the manner shown in FIGS. 4 and 5.

Figure 4:
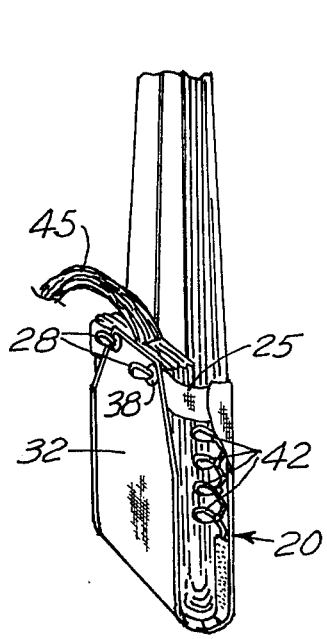
FIG. 4 is a fragmentary perspective view illustrating the next step in the stowage procedure in which the cover portion of the panel is folded back over the folded skirt and is initially secured by a pair of yieldable fasteners.

Each of the side margins of the upper half of the base portion 30 of panel 20 has a tape sewn thereto at spaced points to form a series of loops 40 to carry relatively heavy rubber bands 42, only one of the rubber bands being shown in FIG. 2. The number of rubber bands that is required varies with the length of the canopy suspension lines. In this particular embodiment of the invention, there are four rubber bands 42 on each side of the base portion of the panel, as indicated in FIGS. 3 and 4.

The upper edge of the base portion 30 of the panel is sewn to the canopy with the base portion straddling one of the radial seams 22 of the canopy. In this instance, the width of the panel 20 is somewhat greater than the width of the tapered gore 24 of the canopy.

Figure 3:
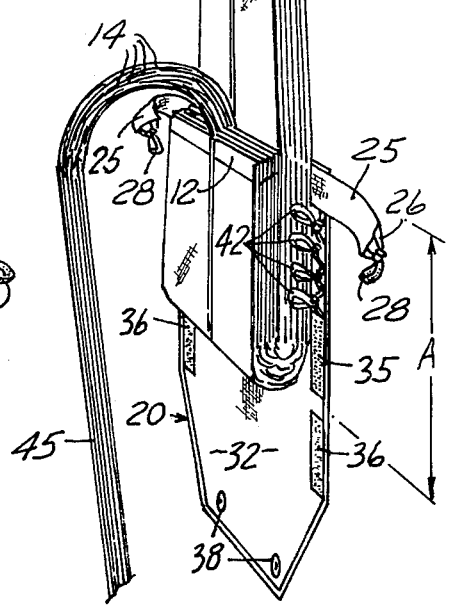
FIG. 3 is a perspective view indicating how in the stowage of the parachute the canopy of the parachute is folded on itself to form an elongated shape with the skirt of the canopy at one end of the shape and then the skirt end of the elongated shape is folded over.

The first step in the procedure for stowing the parachute assembly is to form the canopy into an elongated shape that is generally designated by numeral 44 in FIG. 3, with the skirt 12 of the canopy at one end of the elongated shape and the apex of the canopy at the other end. The canopy may be rolled or folded to such an elongated shape in any suitable manner.

The particular elongated shape that is shown in FIG. 3 is obtained by folding the canopy back on itself along longitudinal fold lines that bisect the individual gores 24 of the panel. Thus, the canopy is folded into layers that are of the width of a single gore 24 of the canopy, with a radial seam 22 of the canopy bisecting each of the folded layers. Since the suspension lines 14 are connected to the canopy 19 at the ends of the seams 22, the formation of the canopy into the elongated shape 44 brings all of the suspension lines 40 together as indicated in FIG. 3, to make it a simple matter to form the suspension lines into a rope-like bundle 45.

The next step in the stowage procedure is to fold back the skirt 12 of the elongated shape 44 in the manner shown in FIG. 3. In FIG. 3, the longitudinal dimension of the skirt portion that is folded back is indicated by A, which is substantially the distance from the top edge of the panel 20 to the fold line 34. Panel 20 is sewn to the canopy at a position where the fold line 34 of the panel is spaced from the edge of the skirt 12 by the same distance A, to permit the skirt portion of the same dimension to be folded back as shown.

Figure 5:
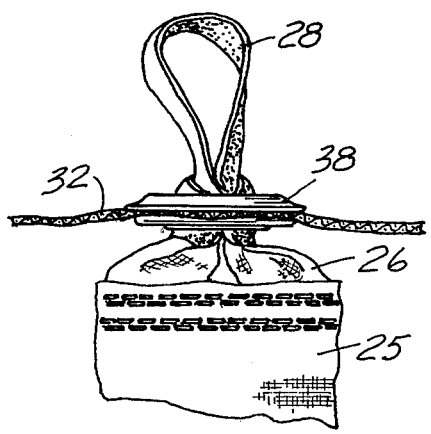
FIG. 5 is a greatly enlarged fragmentary view, partly in section, showing a portion of the structure in FIG. 4.

Starting with the parts arranged as shown in FIG. 3, the next step in the stowage sequence is to fold the cover portion 32 of the panel 20 over onto the folded skirt of the elongated shape 44 and to insert the rubber bands 28 on the strap ends 25 through the grommets 38 as shown in FIGS. 4 and 5. Then the fastener patches 36 of the cover portion of the panel are pressed into releasable engagement with the fastener patches 35 of the base portion to hold the corresponding edges of the panel together as shown in FIG. 7.

Figure 6:
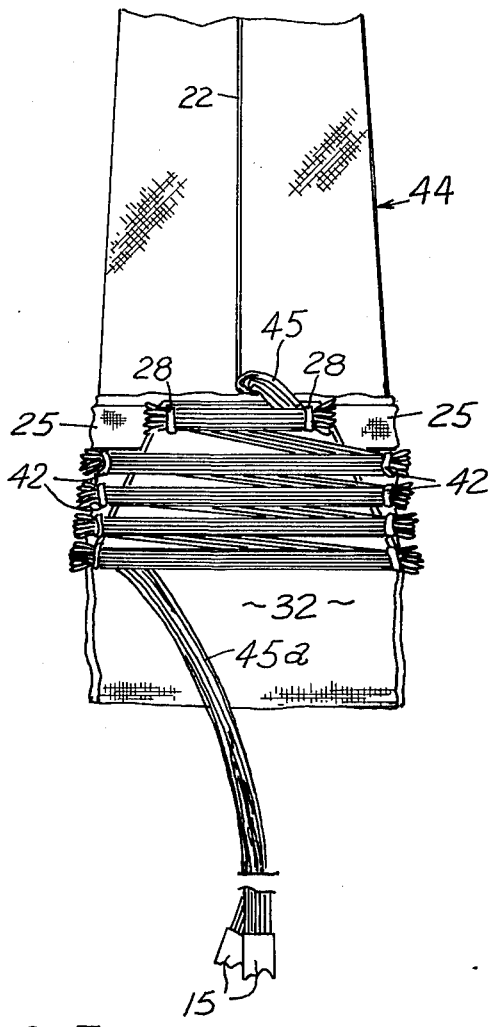
FIG. 6 is a fragmentary elevational view illustrating the next step in the stowage procedure in which the suspension lines of the parachute are grouped into a rope-like bundle and the bundle is folded to zigzag configuration with the zigzag folds engaging yieldable fasteners of the panel to keep the panel closed.

The next step in the stowage procedure is illustrated in FIG. 6, wherein the rope-like bundle 45 of the suspension lines is folded to a zigzag configuration across the folded cover portion 32 of the panel. As can be seen in FIG. 6, the first fold in the zigzag configuration that is nearest the folded skirt of the canopy is inserted through one of the rubber bands 28 in a retractable manner, and the second fold is inserted through the other rubber band 28. The remaining folds of the zigzag configuration of the rope-like bundle are retractably extended through the rubber bands 42 in sequence, leaving an end portion 45a of the bundle extending to the pair of risers 15.

Figure 7:
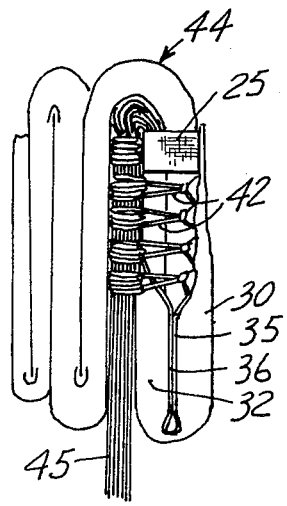
FIG. 7 is an elevational view showing the structure of FIG. 6 folded into a compact package for stowage in a conventional releasable parachute container.

The next step in the stowage sequence is to fold the extended portion of the elongated shape 44 of the canopy back upon itself in the manner shown in FIG. 7 to form the parachute assembly into a compact package. This compact package is then shaped and dimensioned for enclosure in a conventional releasable parachute container (not shown).

When the parachute container is opened by manipulation of its ripcord to initiate deployment of the parachute assembly, the small pilot parachute 18 is released with spring action in a well-known manner. The drag of the inflated pilot parachute retards its rate of descent relative to the rate of descent of the free-falling jumper, to cause the elongated shape 44 of the canopy to stretch out, and, of course, to cause the risers 15 to stretch out to complete the first stage of the deployment sequence.

Figure 8:
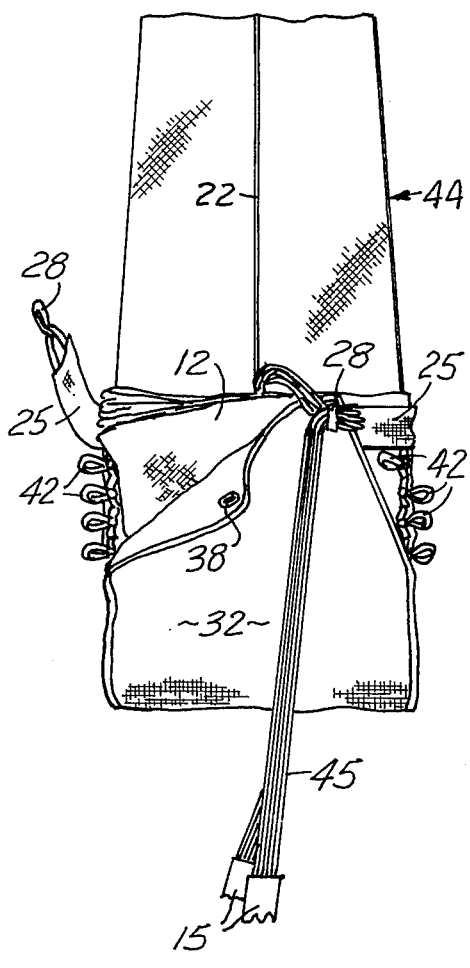
FIG. 8 is a fragmentary elevational view illustrating a second stage in the subsequent deployment sequence wherein the rope-like bundle of suspension lines is stretched out with consequent sequential disengagement of the folds of the rope-like bundle from the yieldable fasteners of the panel.

In the second stage of the deployment sequence, the pull on the rope-like bundle 45 of suspension lines retracts the folds of the zigzag configuration of the rope-like bundle from the rubber bands 42 to progressively stretch out the suspension lines. As may be understood by reference to FIG. 6, the zigzag folds are withdrawn from the rubber bands 42 in sequence until the rope-like bundle 45 is nearly fully stretched out, to retract the final folds of the bundle from the two rubber bands 28. FIG. 8 shows the stretched-out bundle of suspension cords ready to withdraw the final fold of the zigzag configuration from the last rubber band 28 to completely free the cover portion 32 of the panel 20 from the two sprap ends 25.

At this point in the deployment sequence, when the suspension lines 14 are nearly completely stretched out, the parts of the parachute assembly are arranged in the manner shown in FIG. 3. It is apparent that the final tensioning of the suspension lines 14 unfolds the skirt 12 of the elongated shape 44.

Up to this point in the deployment sequence, the rounded fold of the skirt end of the elongated shape 44 has been heading into the airstream to preclude any possibility of the airstream ramming into the edges of the canopy skirt. In fact, with the edges of the canopy skirt turned away from the airstream, the tendency of the airstream is actually to withdraw air from the canopy skirt.

The final stretching out or tightening of the suspension lines 14 causes the suspension lines to unfold the skirt end of the elongated shape 44 with snap action to direct the canopy skirt into the airstream. The result is prompt inflation of the canopy when both the elongated shape 44 of the canopy and the suspension lines 45 are fully stretched out.

Figure 9:
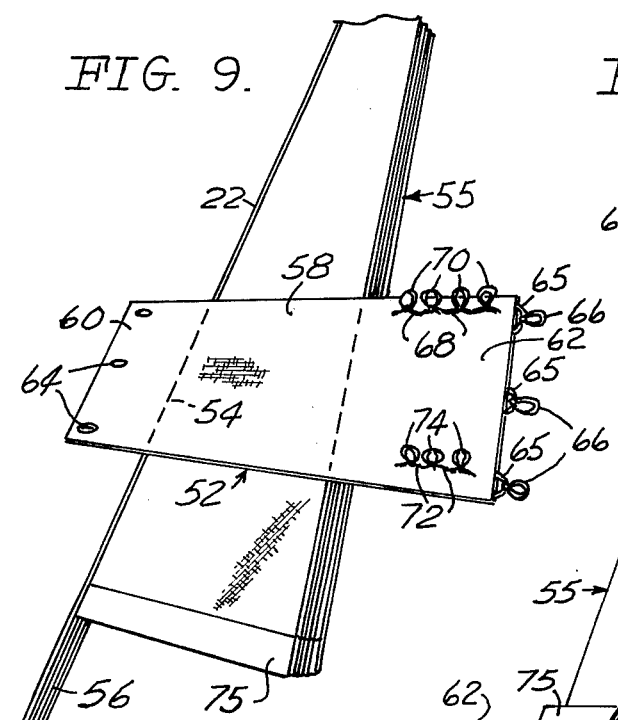
FIG. 9 is a perspective view of a second embodiment of the invention at the stage in the stowage procedure where the canopy of the parachute is formed into an elongated shape that is attached to a panel of flexible sheet material.

In FIGS. 9–12, illustrating the second embodiment of the invention, a panel 52 of flexible sheet material is sewn to one of the seams 22 of the canopy along the dotted line 54. In FIG. 9 the canopy is folded to form an elongated shape 55, the width of which is one-half the width of a tapered gore 24 of the canopy. With each gore 24 of the panel of the canopy folded along a line that bisects the gore longitudinally, all of the seams 22 of the canopy are at one edge of the elongated shape, as shown in FIG. 9, to bring all of the suspension lines 14 together in the form of a rope-like bundle 56.

As may be seen in FIG. 9, a base portion 58 of the panel 52 lies across the elongated shape 55 with a flap 60 extending beyond one side edge of the elongated shape 55 and a flap 62 extending beyond the other side edge. The flap 60 is provided with three spaced grommets 64, and the outer edge of the second flap 62 is provided with three similarly spaced tape loops 65, which carry corresponding rubber bands 66. The upper margin of the outer face of the flap 62 of the panel has a row of four tape loops 68, which carry corresponding rubber bands 70, and in like manner the lower margin of the flap is provided with a row of three tape loops 72 that carry corresponding rubber bands 74.

With the parts of the parachute assembly arranged in the manner shown in FIG. 9, the stowage sequence is continued by turning the elongated shape 55 over to position the panel 52 under the elongated shape with the back face of the panel uppermost. The skirt end of the elongated shape is then bent back onto the elongated shape to direct the edges of the skirt 75 toward the apex end of the elongated shape 55.

Figure 11:
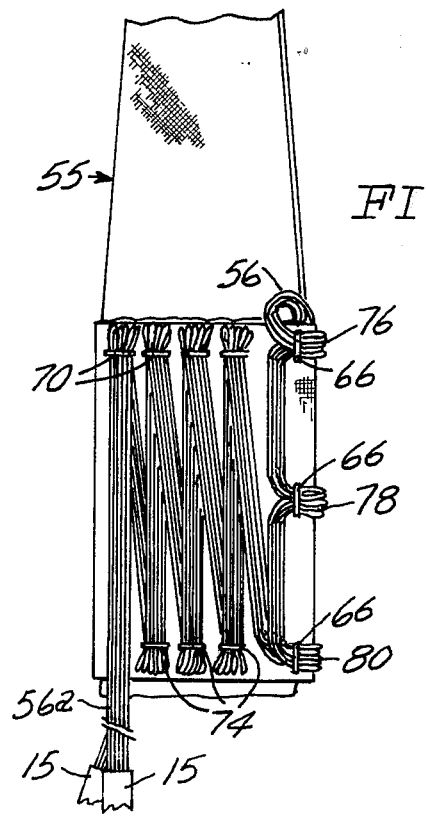
FIG. 11 is an elevational view illustrating the next step in the stowage procedure wherein the rope-like bundle of suspension lines is laced back and forth over the folded panel with the rope-like bundle engaging yieldable fasteners of the panel.

In the next step of the stowage sequence, illustrated by FIG. 11, the flap 62 of the panel is folded over the folded skirt end of the elongated shape 55, and then the second flap 60 is folded over to permit the three rubber bands 66 of flap 62 to be inserted into the corresponding three grommets 64 of the flap 60 to temporarily interconnect the two flaps.

The next step is to fold the rope-like bundle 56 of the suspension lines into the configuration shown in FIG. 11, with folds of the rope-like bundle retractably extended into the various rubber bands. First, the portion of the rope-like bundle 56 that is nearest to the skirt 75 of the canopy is formed into a fold 76 that is inserted into the uppermost of the three rubber bands 66 that extend through the three grommets of the flap 60. A second fold 78 of the rope-like bundle is inserted into the second rubber band 66, and a third fold 80 is inserted into the third rubber band 66, thus interconnecting the overlapping margins of the two flaps 60 and 62.

The remainder of the rope-like bundle of suspension lines is formed to the zigzag configuration shown in FIG. 11, with folds of the zigzag configuration inserted into the rubber bands 70 and 74 alternately. As a result, a short end portion 56a of the rope-like bundle 56 extends beyond the lower edge of the panel to the two risers 15 that connect the suspension lines with the harness of the jumper.

Figure 12:
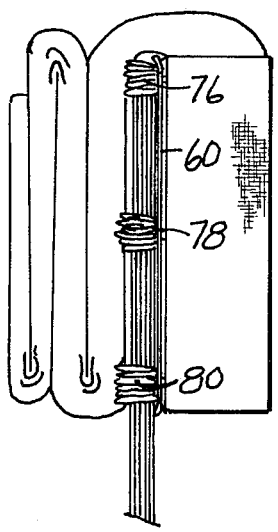
FIG. 12 is an elevational view showing the structure of FIG. 11 folded into a compact package for stowage in a conventional releasable parachute container.

To continue the stowage of the parachute assembly, the elongated shape 55 is repeatedly folded back on itself, as shown in FIG. 12, to form a compact package of a size and shape for enclosure in a conventional releasable parachute container (not shown).

In the subsequent deployment sequence, the parachute container flies open to release the compact package to the airstream, and the pilot parachute that is connected to the apex of the canopy functions in a manner heretofore described to stretch out the elongated shape 55 of the canopy and to stretch out the risers 15 that are connected to the suspension lines of the assembly, thus completing the first stage in the deployment sequence.

In the second stage of the deployment sequence, the tensioning of the rope-like bundle of the suspension lines withdraws the folds of the zigzag configuration of the rope-like bundle from the rubber bands 70 and the rubber bands 74 alternately. Then the folds 80, 78 and 76 of the rope-like bundle are withdrawn from the three rubber bands 66 in sequence to permit the two flaps 60 and 62 to fly open. The final stretching out of the rope-like bundle of the suspension lines unfolds the skirt end of the elongated shape 55 with snap action to direct the edges of the skirt 75 of the canopy into the airstream with consequent prompt inflation of the canopy.

Figure 13:
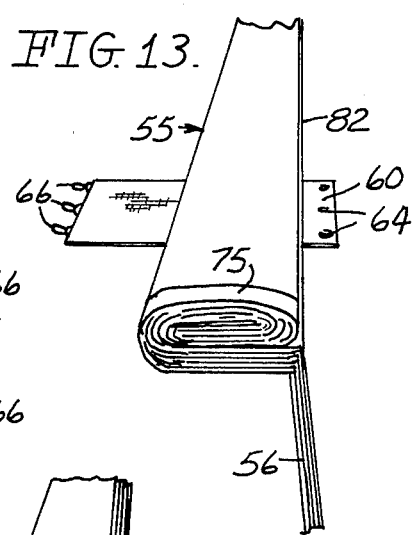
FIG. 13 is a perspective view similar to FIG. 9, but in upside-downposition relative thereto, showing how the canopy may be first folded and then rolled to an elongated shape with the skirt of the canopy at one end of the elongated shape.
Figure 10:
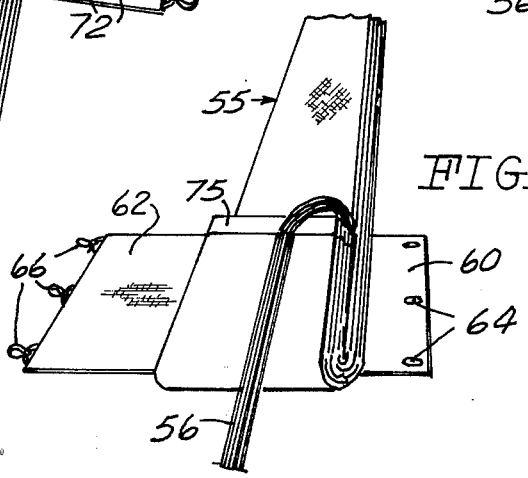
FIG. 10 is a perspective view illustrating the next step in the stowage procedure where the skirt end of the elongated shape is folded back.

FIG. 13 shows how the elongated shape 55 of FIG. 9 may be rolled on itself to form a narrower elongated shape 82. The stowage of this narrow elongated shape is carried out in the same manner as the stowage of the elongated shape 55, the skirt end of the elongated shape 82 being first bent back onto the rest of the elongated shape.

My description in specific detail of the preferred embodiments of the invention will suggest various changes, substitutions, and other departures from my disclosure within the spirit and scope of the appended claims.

What I claim is:

1. In parachute means of the type adapted for stowage in a parachute container including a parachute canopy, having the usual gores and a skirt, and suspension lines that connect the skirt to risers on a jumper's harness, the improvement comprising:

a flexible panel having a base portion with side edges and a free upper edge and a cover portion with side edges and a free lower edge, said flexible panel being shaped and sized so that it is foldable along a transverse line dividing its base portion from its cover portion to place the base portion and cover portion in superimposed relationship with their corresponding side edges in substantial juxtaposition for predetermined distances from said transverse line;

said flexible panel having a front face and a back face and said improvement including means securing the base portion of the panel, back face down, to the outer surface of said canopy to hold said base portion substantially flat thereagainst when the canopy is inflated, said cover portion being free of attachment to the canopy so that it can be folded up over said base portion along said transverse line;

said parachute means including yieldable fastening means for yieldably fastening the cover portion of said flexible panel in its folded position over said base portion, the yieldable fastening means being adapted to yieldably hold the cover and base portions in folded relationship and serving to maintain said corresponding side edges of the folded base and cover portions in relatively close proximity for said predetermined distances to thereby provide a pocket-like pouch therebetween when the parachute means is stowed in said container;

the base portion of said flexible panel being fastened to said canopy so that its side edges straddle a radial seam between adjacent gores of the canopy, and said transverse line runs substantially perpendicular to said radial seam at a predetermined distance from the skirt of the canopy;

said improvement being adapted to cooperate with the other parts of said parachute means so that the latter can be made into a compact parachute assembly shaped and dimensioned for stowage in said parachute container by the steps of;

forming said canopy into a compact elongate shape adjacent the back face of said panel with the skirt of the canopy at one end of the elongate shape and the apex of the canopy at the other end, the elongate shape being of a conventional configuration for parachute packing purposes in the sense that all of said suspension lines are brought together at its skirt end, the width of said flexible panel being such that the sides of said elongate shape are spaced inwardly from said corresponding side edges of the base and cover portions of the panel at least for said predetermined distances;

folding the skirt end of the elongate shape back so that the folded end of the said shape coincides substantially with the position of said transverse line;

grouping said suspension lines into a rope-like bundle;

folding the cover portion of said flexible panel over the folded skirt end of the elongate shape;

folding said rope-like bundle of suspension lines to zig-zag configuration across the folded cover portion of said flexible panel and releasably fastening the folds of said rope-like bundle in position against the flexible panel and folded canopy skirt, the fastening being accomplished by means of at least part of said yieldable fastening means and said at least part of said yieldable fastening means including said zig-zag configuration of the rope-like bundle and a plurality of fastening means engaging the opposite folds of the zig-zag configuration to cooperate with the rope-like bundle to confine the folded skirt of the canopy between the cover and base portions of said panel, said plurality of fastening means being yieldable to release the folds of the rope-like bundle in sequence in response to substantial pull on said rope-like bundle; and doubling the elongate shape back on said folded panel to make the assembly compact;

whereby when the compact assembly is released for deployment in an airstream by a jumper using the parachute means, the drag on the compact assembly stretches out the folded portion of the elongate shape that is outside of the folded flexible panel and also stretches out said risers to exert pull on the rope-like bundle of suspension lines, and the pull on the rope-like bundle of suspension lines releases the zig-zag folds of the rope-like bundle from said plurality of fastening means in sequence to release the folded skirt from the flexible panel to permit the pull of the stretched suspension lines to unfold the folded skirt and turn the skirt into the airstream with subsequent inflation of the canopy, the airstream air being prevented from blowing directly into said pocket-like pouch of the folded flexible panel prior to release of the folded skirt therefrom and thereby causing a risk of premature release of the rope-like bundle of suspension lines from said fastening means, and premature inflation of the canopy, by virtue of the fact that the width of the folded end of said flexible panel exceeds that of the folded skirt and the further fact that said yieldable fastening means holds said corresponding side edges of the folded base and cover portions of said panel in said relatively close proximity for said predetermined distances prior to said release of said folded skirt.

2. An improvement in accordance with claim 1 in which said parachute means includes a pilot parachute attached to the apex of said canopy.

3. An improvement in accordance with claim 1 in which said plurality of fastening means engaging the opposite folds of said zig-zag configuration comprises looped elastic means and means fixedly securing the looped elastic means to the base portion of said flexible panel near the side edges of said base portion.

4. An improvement in accordance with claim 3 in which the base and cover portions of said flexible panel are of substantially the same length and the fastened position of the panel on said canopy is such that the lower edge of its cover portion coincides substantially with the edge of said skirt.

5. An improvement in accordance with claim 4 in which said yieldable fastening means includes holding means for releasably holding said corresponding side edges of the base and cover portions of said flexible panel in contact for at least most of said predetermined distances from the transverse line along which the panel is folded when said parachute means is formed into said parachute assembly.

6. An improvement in accordance with claim 5 in which said holding means consists of cooperating fastener patches adapted to releasably adhere for purposes of interconnecting said side edges of the base and cover portions of said flexible panel in said parachute assembly.

7. An improvement in accordance with claim 6 in which said fastener patches are Velcro patches.

8. An improvement in accordance with claim 6 in which the side edges of said cover portion of said flexible panel converge inwardly beyond said predetermined distances in the folded panel and in which the outer corners of the converging part of said cover portion are fitted with grommets; and in which said base portion of said flexible panel has a strap transversely affixed to its upper end with looped elastic means fastened to its ends;

said strap and looped elastic means being adapted to permit retractable insertion of the latter through said grommets to engage folds of the zig-zag configuration of said rope-like bundle and thereby cooperate with the folds to form part of said yieldable fastening means.

* * * * *